(12) United States Patent
Majid et al.

(10) Patent No.: US 9,014,522 B2
(45) Date of Patent: Apr. 21, 2015

(54) OPTICAL COUPLERS AND METHODS FOR MAKING SAME

(75) Inventors: Imtiaz Majid, Shrewsbury, MA (US); Chih-Hao Wang, Brimfield, MA (US); Kanishka Tankala, South Windsor, CT (US)

(73) Assignee: Nufern, Eash Granby, CT (US)

(*) Notice: Subject to any disclaimer, the term of this patent is extended or adjusted under 35 U.S.C. 154(b) by 0 days.

(21) Appl. No.: 13/996,916

(22) PCT Filed: Dec. 21, 2011

(86) PCT No.: PCT/US2011/066481
§ 371 (c)(1),
(2), (4) Date: Jun. 21, 2013

(87) PCT Pub. No.: WO2012/088269
PCT Pub. Date: Jun. 28, 2012

(65) Prior Publication Data
US 2013/0287338 A1    Oct. 31, 2013

Related U.S. Application Data

(60) Provisional application No. 61/426,553, filed on Dec. 23, 2010.

(51) Int. Cl.
*G02B 6/26* (2006.01)
*G02B 6/27* (2006.01)
(Continued)

(52) U.S. Cl.
CPC ............ *G02B 6/274* (2013.01); *G02B 6/02109* (2013.01); *G02B 6/2843* (2013.01);
(Continued)

(58) Field of Classification Search
CPC ... G02B 6/02109; G02B 5/1833; G02B 6/274
USPC ......................................................... 385/43
See application file for complete search history.

(56) References Cited

U.S. PATENT DOCUMENTS 4,861,127 A * 8/1989 Failes ............................. 385/42
(Continued)

FOREIGN PATENT DOCUMENTS

EP            2071376        6/2009
(Continued)

OTHER PUBLICATIONS

Sanchez, Anthony; "Advances in high Power fiber Laser and Amplifier Components for Space Environments," vol. 7817; Aug. 3, 2010; p. 3.
(Continued)

*Primary Examiner* — Charlie Y Peng
(74) *Attorney, Agent, or Firm* — McDonnell Boehnen Hulbert & Berghoff LLP

(57) ABSTRACT

The present invention relates generally to optical waveguides for the transmission of electromagnetic energy. The present invention relates more particularly to optical couplers for coupling optical fibers, and methods for making them. One aspect of the present invention is an optical coupler for use with a polarization-maintaining input optical fiber and a polarization-maintaining output optical fiber. The coupler includes: a tube having a wide end, a narrow end having an end face, and a taper therebetween; a polarization-maintaining feed-through optical fiber having a first end having an end face and a second end, the polarization-maintaining feed-through optical fiber being disposed within the tube from the wide end to the narrow end, at least the narrow end of the tube being fused around a first length of the polarization-maintaining feed-through optical fiber including the first end of the polarization-maintaining feed-through optical fiber to form a coupler end face comprising the end face of the tube and the end face of the first end of the polarization-maintaining feed-through optical fiber. In one aspect of the invention, the polarization-maintaining feed-through optical fiber has an outer diameter no greater than about 200 μm in the region in which the tube is fused around it. In another aspect of the invention, the polarization-maintaining feed-through optical fiber has an outer diameter at the coupler end face no greater than about 75% of the diameter of the polarization-maintaining input optical fiber.

23 Claims, 10 Drawing Sheets

(51) Int. Cl.
*G02B 6/28* (2006.01)
*B29D 11/00* (2006.01)
*G02B 6/02* (2006.01)
*H01S 3/067* (2006.01)
*H01S 3/07* (2006.01)
*H01S 3/094* (2006.01)

(52) U.S. Cl.
CPC ........... *H01S3/06712* (2013.01); *H01S 3/0675* (2013.01); *H01S 3/07* (2013.01); *H01S 3/094011* (2013.01); *H01S 3/094019* (2013.01); *H01S 3/09408* (2013.01); *B29D 11/00711* (2013.01)

(56) References Cited

U.S. PATENT DOCUMENTS

| | | | |
|---|---|---|---|
| 8,712,199 B2 * | 4/2014 | Kopp et al. | 385/43 |
| 2002/0197014 A1 * | 12/2002 | Anjan | 385/43 |
| 2008/0050069 A1 * | 2/2008 | Skovgaard et al. | 385/39 |
| 2009/0154879 A1 * | 6/2009 | Salokatve | 385/43 |
| 2009/0202204 A1 * | 8/2009 | Nielsen et al. | 385/43 |
| 2010/0195678 A1 | 8/2010 | Kuka | |
| 2011/0123155 A1 * | 5/2011 | Kumkar et al. | 385/43 |

FOREIGN PATENT DOCUMENTS

| | | |
|---|---|---|
| WO | 2007/148127 | 12/2007 |
| WO | 2009/080039 | 7/2009 |

OTHER PUBLICATIONS

Notification of transmittal of the International Search Report and the Written Opinion of the International Searching Authority for International Application No. PCT/US2011/066481 filed Dec. 21, 2011.

* cited by examiner

OPTICAL COUPLERS AND METHODS FOR MAKING SAME

CROSS-REFERENCE TO RELATED APPLICATIONS

This application is a U.S. National Phase Application of International Patent Application No. PCT/US2011/066481 filed on Dec. 21, 2011, which claims the benefit of priority of U.S. Provisional Patent Application Ser. No. 61/426,553, filed Dec. 23, 2010, which is hereby incorporated herein by reference in its entirety.

STATEMENT REGARDING FEDERALLY SPONSORED RESEARCH OR DEVELOPMENT

This invention was made with government support under contract N68936-10-C-0024 awarded by the United States Navy's Small Business Innovation Research Program. The government has certain rights in the invention.

BACKGROUND OF THE INVENTION

1. Field of the Invention

The present invention relates generally to optical waveguides for the transmission of electromagnetic energy. The present invention relates more particularly to optical couplers for coupling optical fibers, and methods for making them.

2. Technical Background

Fiber lasers have many attractive properties that make them suitable for various industrial applications. Such properties can include one or more of good beam quality, easy thermal management, compact size, and good efficiency. Fiber lasers are therefore often preferred to conventional types of lasers, such as solid-state and gas lasers. Fiber lasers are able to produce optical output in the several kW range with excellent beam quality. Thus, these lasers can be used for macro-machining applications like welding and cutting of metal. Furthermore, fiber lasers lend themselves for operation with ultra-short pulses by a method of mode-locking, enabling them to be used in micro-machining applications as well.

As any laser, a fiber laser can include a gain medium, an optical resonator, means of coupling energy into the gain medium, and means of extracting light out of the optical resonator. The gain medium in a fiber laser can include a length of an optical fiber, the "active fiber." Typically the core of the active fiber is doped with optically active atoms such as rare-earth atoms (e.g., Er or Yb). The optical resonator can be formed by surrounding the gain medium with mirrors that, when properly aligned with respect to the active fiber, force some of the light emitted by the active atoms to bounce between the mirrors through the gain medium and get amplified. The mirrors can be either bulk optical mirrors, or they can be directly fabricated into optical fibers. In the latter case they are usually fiber Bragg gratings (FBGs), but other fiber-based or free space mirrors can also be used. Fiber-based mirrors are attractive since they can be directly attached or spliced to other fibers with very low optical losses. The mirrors, or typically only one of the two mirrors, are made only partially reflective to provide a route for extraction of light out of the optical resonator. In fiber lasers, the extracted light can be further guided with a length of optical fiber close to the point of interest, such as the work-piece. The extracted light thus forms a beam of laser light that can be used in the final application.

The active fiber is typically an electric insulator. Thus, energy cannot usually be supplied to it directly in the form of electric power. However, the active atoms absorb optical radiation within certain wavelength ranges called their absorption bands. This property is utilized in fiber lasers by feeding or "pumping" the energy into the gain medium in the form of radiation. This radiation is called the pump radiation, and is usually generated by pump diode lasers, which preferably are fiber coupled. Thus, a fiber laser typically includes a pump coupler that couples the pump radiation into the active fiber. It can be desirable that the pump coupler has a signal feed-through whereby the laser signal can pass through the coupler with low optical losses. This property can be beneficial to the properties of the laser cavity, and is generally desired in industrial class fiber lasers.

There are a number of ways of making a pump coupler using free-space optics, but these can typically require painstaking alignment and can be very sensitive to vibration and thermal effects. All-fiber pump couplers are known, but these can be difficult to fabricate, and often induce unacceptable losses to the pump light and/or the fed-through signal. Moreover, it can often be desirable for the signal feed-through fiber to pass a signal having a given polarization; many existing coupler designs are incompatible with polarization-maintaining fibers or other polarization-maintaining optical components.

Accordingly, there remains a need for a polarization-maintaining coupler that addresses one or more of the drawbacks or deficiencies of the prior art.

SUMMARY OF THE INVENTION

One aspect of the present invention is an optical coupler for use with a polarization-maintaining input optical fiber and polarization-maintaining output optical fiber, the optical coupler including:
  a tube having a wide end, a narrow end having an end face, and a taper therebetween;
  a polarization-maintaining feed-through optical fiber having a first end having an end face, the polarization-maintaining feed-through optical fiber being disposed within the tube from the wide end to the narrow end, at least the narrow end of the tube being fused around a first length of the polarization-maintaining feed-through optical fiber including the first end of the polarization-maintaining feed-through optical fiber to form a coupler end face comprising the end face of the tube and the end face of the first end of the polarization-maintaining feed-through optical fiber,
  wherein the polarization-maintaining feed-through optical fiber has an outer diameter at the coupler end face no greater than about 75% of the diameter of the input optical fiber.

Another aspect of the invention is an optical coupler for use with a polarization-maintaining input optical fiber and polarization-maintaining output optical fiber, the optical coupler comprising:
  a tube having a wide end, a narrow end having an end face, and a taper therebetween;
  a polarization-maintaining feed-through optical fiber having a first end having an end face and a second end, the polarization-maintaining feed-through optical fiber being disposed within the tube from the wide end to the narrow end, at least the narrow end of the tube being fused around a first length of the polarization-maintaining feed-through optical fiber including the first end of the polarization-maintaining feed-through optical fiber to form a coupler end face comprising the end face of the tube and the end face of the first end of the polarization-maintaining feed-through optical fiber, wherein the wherein the polarization-maintaining feed-through optical fiber has an outer diameter no greater than about 200 µm at the coupler end face.

Another aspect of the invention is an optical fiber device including an optical coupler as described above.

Another aspect of the invention is an optical fiber device including an optical coupler as described above, and at least one optical fiber optically coupled to the wide end of the tube.

Another aspect of the invention is an optical fiber device including an optical coupler as described above, and a polarization-maintaining optical fiber optically coupled to the coupler end face of the optical coupler.

Another aspect of the invention is an optical fiber device including an optical coupler as described above, and a polarization-maintaining input optical fiber optically coupled to the second end of the polarization-maintaining feed-through optical fiber.

Another aspect of the invention is a method for manufacturing an optical coupler as described herein, the method comprising:
 providing a tube having a wide section, a narrow section and a taper therebetween;
 providing a polarization-maintaining feed-through optical fiber having a diameter of less than about 75% of the diameter of the polarization-maintaining input optical fiber along at least a length thereof;
 disposing the polarization-maintaining feed-through optical fiber at least partially within the tube, so that it extends from the wide section into the narrow section, and so that the length having the diameter of less than about 50% of the diameter of the polarization-maintaining input optical fiber is disposed within the narrow section of the tube;
 collapsing at least the narrow section of the tube onto the polarization-maintaining feed-through optical fiber along at least part of the length having the diameter of less than about 75% of the diameter of the polarization-maintaining input optical fiber, forming a fused section; and
 cleaving the fused section to form a coupler end face comprising an end face of the tube and an end face of the polarization-maintaining feed-through optical fiber.

Another aspect of the invention is a method for manufacturing an optical coupler as described above, the method including
 providing a tube having a wide section, a narrow section and a taper therebetween;
 providing a polarization-maintaining feed-through optical fiber having a diameter of less than about 200 µm along at least a length thereof;
 disposing the polarization-maintaining feed-through optical fiber at least partially within the tube, so that it extends from the wide section into the narrow section, and so that the length having the diameter of less than about 200 µm is disposed within the narrow section of the tube;
 collapsing at least the narrow section of the tube onto the polarization-maintaining feed-through optical fiber along at least part of the length having the diameter of less than about 200 µm, forming a fused section; and
 cleaving the fused section to form a coupler end face comprising an end face of the tube and an end face of the polarization-maintaining feed-through optical fiber.

In various aspects, the present invention can result in a number of benefits. For example, in certain embodiments, the optical couplers of the present invention provide a low-loss signal feed-through for optical radiation propagating in the polarization-maintaining signal feed-through optical fiber, which can be important in providing desired device characteristics. Moreover, in certain embodiments, use of the optical couplers can result in minimal degradation of beam quality for optical radiation traversing through them. In certain embodiments, the optical couplers provide a high efficiency of coupling optical radiation from the wide end of the tube (e.g., from optical fibers coupled thereto) to the coupler end face (e.g., and to a polarization-maintaining output optical fiber coupled thereto), with a relatively low degradation of the polarization of the optical radiation.

DETAILED DESCRIPTION OF THE INVENTION

Figure 1:
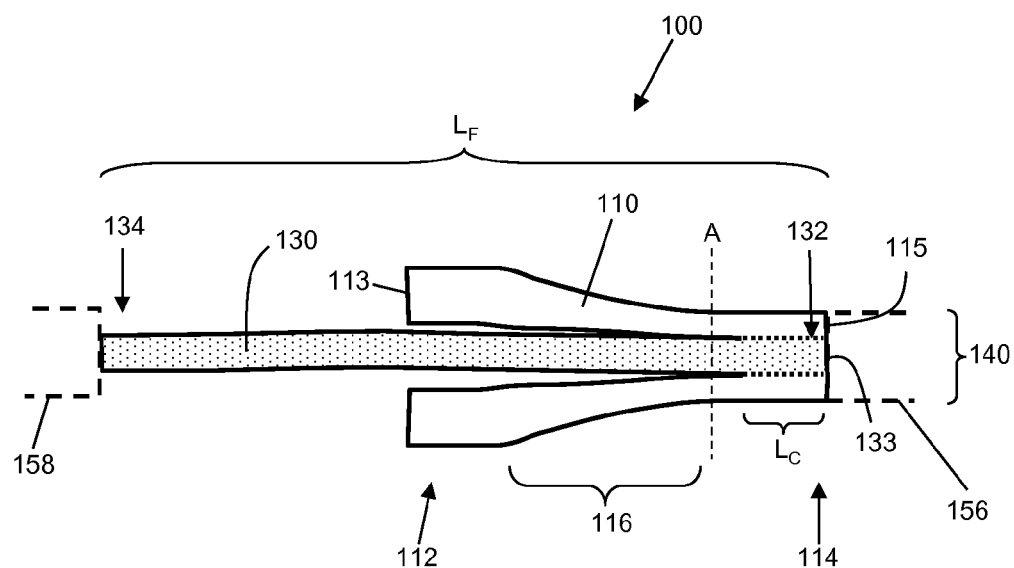
FIG. 1 is a schematic cross-sectional view of an optical coupler according to one embodiment of the invention.

In the following discussion it is assumed that the reader has the basic knowledge of the structure of optical fibers familiar to the person of skill in the art. Thus, the concepts of a fiber core, cladding, and coating are not discussed in detail. As is familiar to the person of skill in the art, the radiation generated in an active optical fiber device, such as a fiber laser or fiber amplifier, here referred to as the signal, propagates generally in the core of the fiber, the diameter of which is typically in the range of a few microns to a few tens of microns. A so-called double-clad fiber generally includes a core, a primary cladding that substantially confines the signal light to the core and guides the pump radiation, and a secondary cladding that substantially confines the pump light to the primary cladding. The core is typically made of doped fused silica, the primary cladding of fused silica, and the secondary cladding of low-index polymer or doped fused silica. Of course, other doping schemes can be used, as would be apparent to the person of skill in the art.

For later reference some further terms or concepts related to fiber processing are also briefly discussed here. Splicing is a well-known term in the art of fiber optics. It refers to joining at least two glass parts together for optical communication, for example, by heating the parts close to the joint to a high temperature to make the glass soft, and then pushing the parts into physical contact with each other. Hence, an intimate and substantially transparent contact is formed between the parts. The heat source for splicing can be, for example, an electric arc, a hot filament or a $CO_2$ laser. Cleaving means cutting a glass part so as to form a flat surface. In optical fibers, the cleave plane often lies essentially perpendicular to the optical axis of the fiber (perpendicular cleave). In some situations, however, the cleave can be made substantially non-perpendicular (angle-cleave). Cleaving can be performed mechanically, for example, by scratching the fiber with a sharp blade made of hard material and applying tension to the fiber to break it, or by a laser. A good cleave for optical fibers makes high quality splicing possible. Another useful, although more laborious, method of providing a flat plane on an end of an optical fiber is the well-known method of mechanical polishing. Stripping means removing the polymer coating from the fiber, usually over a distance of a few centimeters from its end. The term "collapsing" refers to the forming of a tube around an optical fiber to form a single fused piece. Collapsing can be performed by heating a hollow piece of glass, such as a capillary tube, disposed around the optical fiber, in order to soften it and allow it to fuse with the outer surface of the optical fiber. Surface tension forces and/or differential pressure between the inside and outside region of the piece may aid in the shrinking of the glass around the optical fiber. Heating can be done using the same methods as in splicing.

The terms "light" or "optical", as used herein, are used broadly as understood by one of ordinary skill in the art of optical waveguides, and are not to be limited as pertaining only to the visible range of wavelengths.

One embodiment of the invention is an optical coupler, for example, as shown in schematic cross-sectional view in FIG. 1. Optical coupler 100 is for use with an polarization-maintaining input fiber 158, and a polarization-maintaining output fiber 156, both shown in dashed outline. As used herein, the terms "input" and "output" are meant to distinguish the optical fibers from one another. In certain embodiments, optical radiation can flow from the input to the output, from the output to the input, or both during operation of the coupler. Optical coupler 100 includes a tube 110, having a wide end 112 and a narrow end 114 having an end face 115, and a taper 116 between the wide end 112 and the narrow end 114. The optical coupler further includes a polarization-maintaining feed-through optical fiber 130, which has a first end 132 having an end face 133, and a second end 134. The polarization-maintaining feed-through optical fiber 130 is disposed within the tube 110 from its wide end 112 to its narrow end 114.

At least the narrow end 114 of the tube is fused around the first end of the polarization-maintaining feed-through optical fiber, thereby forming a coupler end face 140 that includes the end face 115 of the tube and the end face 133 of the first end of the polarization-maintaining feed-through optical fiber. In use, optical radiation coupled into the wide end of the tube propagates through the taper and into the narrow end of the tube. Where the tube is fused around the polarization-maintaining feed-through optical fiber (i.e., at its narrow end), the radiation can couple from the tube into the polarization-maintaining feed-through optical fiber (e.g., into its cladding). Moreover, the coupler end face provides a surface that can in certain embodiments be coupled to a separate polarization-maintaining optical fiber such that radiation propagating in the tube can be coupled into the separate polarization-maintaining optical fiber (e.g., as described below with reference to FIG. 6). Desirably, the tube is fused around the polarization-maintaining feed-through optical fiber such that there is substantially no visible interface between the two. The tube can be made to fuse around the optical fiber, for example, by a collapsing method, as described briefly above and in more detail below.

In the embodiment of FIG. 1, the tube is fused around the polarization-maintaining feed-through optical fiber (as shown by the dotted line) over a distance $L_c$ extending from its end face 133. The person of skill in the art will determine the necessary distance $L_c$ to provide any desired coupling between the tube and the polarization-maintaining feed-through optical fiber. For example, in certain embodiments, the distance $L_c$ is at least 1 cm. Of course, in other embodiments, the distance Lc can be less than 1 cm; in certain such embodiments, the fusion need only provide an In certain embodiments, the distance $L_c$ is at most 5 cm. The fused region can extend from the narrow end in a variety of ways. The tube can be, for example, fused around the polarization-maintaining feed-through optical fiber only in the neighborhood of the narrow end of the tube. In other embodiments, the fused region extends from the narrow end and into the tapered region of the tube. In certain embodiments, the fused region extends even beyond the tapered region of the tube.

In one aspect of the invention, the polarization-maintaining feed-through optical fiber has an outer diameter no greater than about 75% of the diameter of the polarization-maintaining input optical fiber at the coupler end face. For example, in certain embodiments, the polarization-maintaining feed-through optical fiber has an outer diameter no greater than about 50%, or even no greater than about 35% of the diameter of the polarization-maintaining input optical fiber at the coupler end face. The polarization-maintaining feed-through optical fiber can have, for example, a diameter no greater than about 75%, no greater than about 50%, or no greater than about 35% of the diameter of the polarization-maintaining input optical fiber over a length extending from the coupler end face, for example, at least 0.2 cm, at least 0.5 cm, or even at least 1 cm. In certain embodiments, the polarization-maintaining feed-through optical fiber can have a diameter no greater about 75%, no greater than about 50%, or no greater than about 35% of the diameter of the polarization-maintaining input optical fiber throughout the region in which the tube is collapsed around it. In certain embodiments, the polarization-maintaining feed-through optical fiber has an optical fiber greater than about 10%, or even greater than about 25% of the diameter of the polarization-maintaining input optical fiber over a length extending from the coupler end face, as described above. Because in conventional polarization-maintaining optical fibers, the stress-applying elements extend substantially throughout the optical fiber cladding, the polarization-maintaining feed-through optical fiber can have a lower birefringence in the region in which the tube is fused around it than is conventional in polarization-maintaining optical fibers. For example, in one embodiment, the birefringence of the polarization-maintaining feed-through optical fiber in the region in which the tube is collapsed is less than about 50% of the birefringence of the polarization-maintaining input optical fiber. For example, in certain embodiments, the birefringence of the polarization-maintaining feed-through optical fiber in the region in which the tube is collapsed is less than about 35% of the birefringence of the polarization-maintaining input optical fiber. In certain such embodiments, however, the birefringence of the polarization-maintaining feed-through optical fiber in the region in which the tube is collapsed is at least about 10% of the birefringence of the polarization-maintaining input optical fiber. The person of skill in the art would expect this relatively lower birefringence to degrade the polarization state of a signal propagating in the polarization-maintaining feed-through optical fiber. The data provided herein indicate that the reduced birefringence surprisingly does not induce an unacceptable degradation of polarization state through the coupler. While not intending to be bound by theory, the inventors surmise that this is due to relatively limited length of the polarization-maintaining feed-through optical fiber.

In one aspect of the invention, the polarization-maintaining feed-through optical fiber has an outer diameter no greater than about 200 μm at the coupler end face. For example, in certain embodiments, the polarization-maintaining feed-through optical fiber has an outer diameter no greater than about 150 μm at the coupler end face. In other embodiments, the polarization-maintaining feed-through optical fiber has an outer diameter no greater than about 125 μm at the coupler end face. The polarization-maintaining feed-through optical fiber can have, for example, a diameter no greater than about 200 μm (or 150 μm, or 100 μm) over a length extending from the coupler end face, for example, at least 0.2 cm, at least 0.5 cm, or even at least 1 cm. In certain embodiments, the polarization-maintaining feed-through optical fiber can have a diameter no greater than about 200 μm (or 150 μm, or 100 μm) throughout the region in which the tube is collapsed around it. Because in conventional polarization-maintaining optical fibers, the stress-applying elements extend to a diameter of at least about 300 μm, the polarization-maintaining feed-through optical fiber can have a lower birefringence in the region in which the tube is fused around it than is conventional in polarization-maintaining optical fibers. For example, in one embodiment, the birefringence of the polarization-maintaining feed-through optical fiber in the region in which the tube is collapsed is less than about 50% of the birefringence of the polarization-maintaining input optical fiber. For example, in certain embodiments, the birefringence of the polarization-maintaining feed-through optical fiber in the region in which the tube is collapsed is less than about 25%, less than about 10%, or even less than about 5% of the birefringence of the polarization-maintaining input optical fiber. The person of skill in the art would expect this relatively lower birefringence to degrade the polarization state of a signal propagating in the polarization-maintaining feed-through optical fiber. The data provided herein indicate that the reduced birefringence surprisingly does not induce an unacceptable degradation of polarization state through the coupler. While not intending to be bound by theory, the inventors surmise that this is due to relatively limited length of the polarization-maintaining feed-through optical fiber.

Figure 2:
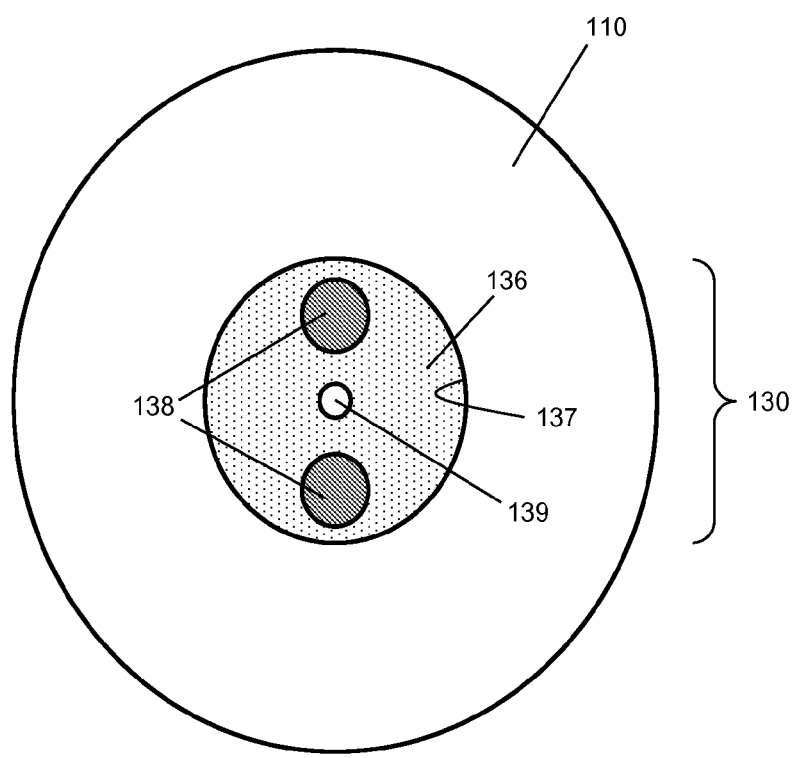
FIG. 2 is a schematic cross-sectional view of the optical coupler of FIG. 1 along line "A"

In certain embodiments, the polarization-maintaining feed-through optical fiber comprises a core, a cladding surrounding the core, and one or more birefringence-inducing elements disposed in the cladding. As the person of skill in the art will recognize, the cladding can be formed from a single material, or a variety of materials (e.g., provided in multiple layers or using a gradation of component concentrations). For example, FIG. 2 presents a different schematic cross-sectional view of the optical coupler of FIG. 1, along the plane marked by dotted line "A". In FIG. 2, tube 110 surrounds polarization-maintaining feed-through optical fiber 130; in this region of the coupler, the tube is not collapsed around the polarization-maintaining feed-through optical fiber 130. Polarization-maintaining feed-through optical fiber 130 includes a core 139, a cladding 136, and two birefringence-inducing elements 138. In this embodiment, the birefringence-inducing elements are stress-applying rods. While the birefringence-inducing elements in FIG. 2 are generally cylindrical rods, the person of skill in the art will appreciate that other configurations of one or more birefringence-inducing elements can be used, for example, elliptical claddings and so-called "bow-tie" elements. Such polarization-maintaining optical fibers are generally known in the art, for example, under names such as "PANDA" or "bow-tie" optical fiber.

In certain embodiments, the one or more birefringence-inducing elements do not extend to the outer surface of the cladding of the polarization-maintaining feed-through optical fiber in the region in which the tube is collapsed around it. For example, as shown in FIG. 2, rods 138 do not extend to the outer surface 137 of cladding 136. Because in conventional polarization-maintaining optical fibers, the stress-applying elements extend substantially throughout the cladding, for example, to a diameter of at least about 300 and the diameter of the polarization-maintaining feed-through optical fiber is substantially reduced at the coupler end face (e.g., to less than 75%, less than 50% or even less than 35%, of the diameter of the polarization-maintaining input optical fiber, or to a diameter of less than about 200 μm, less than about 150 μm, or even less than about 125 μm), the birefringence of the polarization-maintaining feed-through optical fiber can be less than in conventional polarization-maintaining optical fibers, as described above. As described above, the person of skill in the art would expect this to degrade the polarization state of a signal propagating in the polarization-maintaining feed-through optical fiber. The data provided herein indicate that the reduced birefringence surprisingly does not induce an unacceptable degradation of polarization state through the coupler. While not intending to be bound by theory, the inventors surmise that this is due to the relatively limited length of the polarization-maintaining feed-through optical fiber.

The tube can be formed from any convenient material that is compatible with the materials of the polarization-maintaining feed-through optical fiber and substantially transparent to the optical radiation to be used with the optical coupler. For example, the tube can be formed of a glassy material, as is well known in the art. A glass capillary can conveniently be used to form the tube in practicing the present invention. In certain embodiments, the glass capillary has a lower softening point than the materials of the polarization-maintaining feed-through optical fiber.

The tube can take a variety of shapes. In certain embodiments, the wide end of the tube has an annular end face. For example, in the optical coupler of FIG. 1, tube 110 has an annular end face 113 at its wide end 112. In certain embodiments, the inner and outer diameters of the tube are reduced through the taper, but their ratio remains substantially the same. In other embodiments, only the outer diameter of the tube is reduced through the taper. In certain embodiments, the taper is adiabatic, meaning that a lateral dimension of the tube (i.e., its outer diameter) changes slowly along its length, which allows light to be coupled efficiently from the wide end to the narrow end of the tube. The tube desirably has a circular cross-section at its inner surface. Of course, in certain embodiments, the tube can deviate from circularity at its inner surface, for example, at least in areas where it is not fused to the polarization-maintaining feed-through optical fiber. The tube can have a variety of cross-sectional shapes at its outer surface, for example, circular, hexagonal, octagonal or ellipsoidal. In the embodiment of FIG. 2, both the inside and outside surfaces of the tube are circular in cross-section.

In certain embodiments, the entire length of the polarization-maintaining feed-through optical fiber has an outer diameter of less than 75%, less than 50% or even less than 35% of the diameter of the polarization-maintaining input optical fiber, or a diameter of less than about 200 μm, less than about 150 μm, or even less than about 125 μm. In certain such embodiments, the polarization-maintaining feed-through optical fiber preferably has a length of less than about 50 cm, less than about 30 cm, or even less than about 15 cm. For example, in the embodiment of FIG. 1, the polarization-maintaining feed-through optical fiber can have a length $L_F$ less than about 50 cm.

In certain embodiments, only part of the polarization-maintaining feed-through optical fiber has an outer diameter less than 75%, less than 50% or even less than 35% of the diameter of the polarization-maintaining input optical fiber, or a diameter of less than about 200 μm, less than about 150 μm, or even less than about 125 μm. The outer diameter of the polarization-maintaining feed-through optical fiber can be reduced, for example, extending from its first end at least as far as the region in which the tube is fused around it. The rest of the polarization-maintaining feed-through optical fiber can have a larger outer diameter, as is conventional for polarization-maintaining optical fibers. The second end of the polarization-maintaining feed-through optical fiber (i.e., the end to be coupled to a polarization-maintaining input optical fiber) can, for example, have a diameter that is at least 80%, at least 90%, or even substantially the same as the diameter of the polarization-maintaining input optical fiber. In such embodiments, the polarization-maintaining feed-through optical fiber can be efficiently spliced to the polarization-maintaining input optical fiber. The first end of the optical fiber can have its outer diameter reduced by any convenient method, for example, by etching, as is familiar to the person of skill in the art. In certain desirable embodiments, the polarization-inducing elements throughout the polarization-maintaining feed-through optical fiber extend to a diameter less than the diameter of the polarization-maintaining feed-through optical fiber at the coupler end face. In such embodiments, the polarization-maintaining feed-through optical fiber can be etched to provide the desired diameter at the coupler end face, without etching into the polarization-inducing elements.

Figure 3:
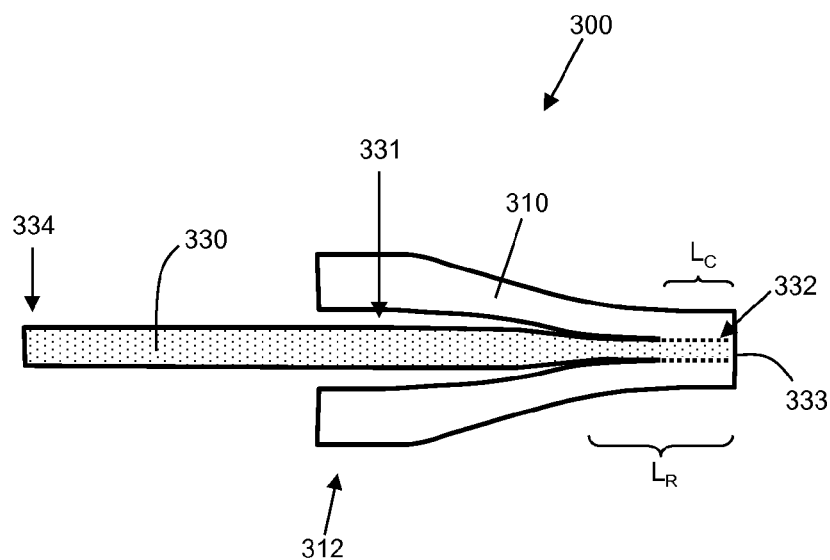
FIG. 3 is a schematic cross-sectional view of an optical coupler according to another embodiment of the invention.

For example, in the coupler 300 of FIG. 3, polarization-maintaining optical fiber 330 has a first end 332 having an end face 333, and a second end 334. The polarization-maintaining feed-through optical fiber has an outer diameter less than 75%, less than 50% or even less than 35% of the diameter of the polarization-maintaining input optical fiber, or a diameter of less than about 200 μm, less than about 150 μm, or even less than about 125 μm over a length $L_R$ extending from its first end toward its second end, and extending through (and somewhat beyond) the region in which the tube 310 is collapsed around it. The rest of the polarization-maintaining feed-through optical fiber can have an outer diameter larger than that of the diameter in the length $L_R$ (e.g., greater than about 200 μm or greater than about 75% of the diameter of the polarization-maintaining input optical fiber. In the embodiment of FIG. 3, in the neighborhood of its second end, the polarization-maintaining feed-through optical fiber can have an outer diameter, for example, of about 400 μm.

In certain embodiments, at a position along its length that is disposed within the wide end of the tube, the polarization-maintaining feed-through optical fiber has an outer diameter that is substantially larger than its outer diameter along its first length around which the tube is collapsed. For example, as shown in FIG. 3, polarization-maintaining feed-through optical fiber 330 is disposed within tube 310, such that at a position 331 disposed within the wide end 312 of the tube, its outer diameter is greater than it is in its length around which the tube is fused. For example, in certain embodiments, the diameter of the polarization-maintaining feed-through fiber in its length around which the tube is collapsed is less than about 75% of, less than about 50% of, or even less than about 35% of its diameter at a position along its length that is disposed within the wide end of the tube.

In certain embodiments, the diameter of the core of the polarization-maintaining feed-through optical fiber is not substantially tapered as it traverses the tube from the wide end to the narrow end of the tube. Accordingly, in certain embodiments, the process used to fuse the tube around the polarization-maintaining feed-through optical fiber (e.g., a collapsing process) does not substantially reduce the diameter of its core. For example, the tube can be made from a glass with a softening temperature less than that of the polarization-maintaining feed-through optical fiber; the temperature used to soften the tube can be selected so as not to soften the polarization-maintaining feed-through optical fiber. In other embodiments, when substantially no tension is on the polarization-maintaining feed-through optical fiber, it will not tend to stretch during the fusion process.

Figure 4:
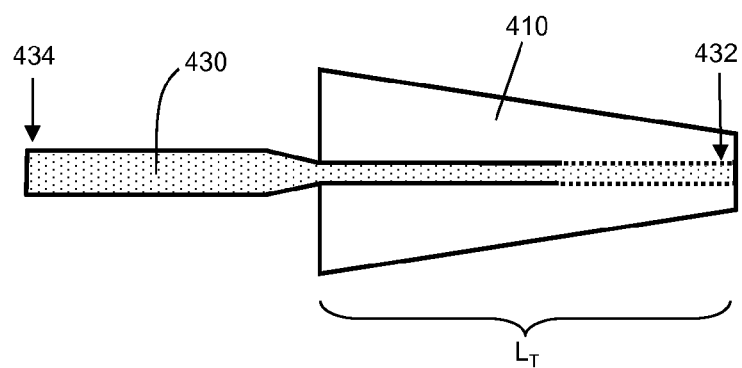
FIG. 4 is a schematic cross-sectional view of an optical coupler according to another embodiment of the invention.

In certain embodiments, the diameter of the polarization-maintaining feed-through optical fiber does not substantially change from the wide end to the narrow end of the tube. For example, as shown above in FIG. 1, when the entire polarization-maintaining feed-through optical fiber is of a constant diameter, it does not reduce in diameter as it traverses the tube. In other embodiments, the polarization-maintaining feed-through optical fiber has a larger diameter at its second end than it does in the region in which it is disposed in the tube. In such embodiments, the polarization-maintaining feed-through optical fiber can be etched (for example) in the region in which it is disposed in the tube. For example, in certain embodiments, the diameter of the polarization-maintaining feed-through fiber in its length around which the tube is collapsed is less than about 75% of, less than about 50% of, or even less than about 35% of its diameter at its second end. In the embodiment shown in FIG. 4, for example, polarization-maintaining feed-through optical fiber 430 is of a conventional width (e.g., about 400 μm) at its first end 434, and significantly narrower (e.g., less than 75%, less than 50% or even less than 35% of the diameter of the polarization-maintaining input optical fiber, or less than about 200 μm, less than about 150 μm, or even less than about 125 μm in diameter) over its length $L_T$ within tube 410. In certain such embodiments, the core of the polarization-maintaining feed-through optical fiber does not substantially taper, as described above.

Another aspect of the invention is an optical fiber device comprising an optical coupler as described above. For example, in one embodiment of an optical fiber device, at least one optical fiber is optically coupled to the wide end of the tube. The at least one optical fiber can be used, for example, to introduce radiation (e.g., pump radiation) into the wide end of the tube. In certain embodiments, as shown in the cross-sectional view FIG. 5, the wide end of the tube has an annular end face, and at least one optical fiber (e.g., at least one pump optical fiber) is end face-coupled to the annular end face. In the optical fiber device 550, optical coupler 500 includes tube 510, which has a wide end 512 having annular end face 513, for example, as described above with respect to FIG. 1. Optical fibers 552 are coupled through their end faces 553 to the annular end face 513. Optical fibers 552 can, for example, be arranged so that their end faces lie essentially in the same plane (e.g., substantially perpendicular to the optical axis 502 of the optical coupler), and so that their optical axes are substantially parallel (i.e., at the plane to which they are aligned). Optical radiation can be coupled from the optical fibers 552 into the wide end of the tube, to be coupled with optical radiation from the polarization-maintaining feed-through optical fiber 530. In certain embodiments, to provide high coupling efficiency between the optical fibers 552 and the wide end of the tube, the wall thickness of the tube at its end face 513 ($W_c$) is at least as great as the thickness of the optical fibers 552 ($W_f$).

Figure 5:
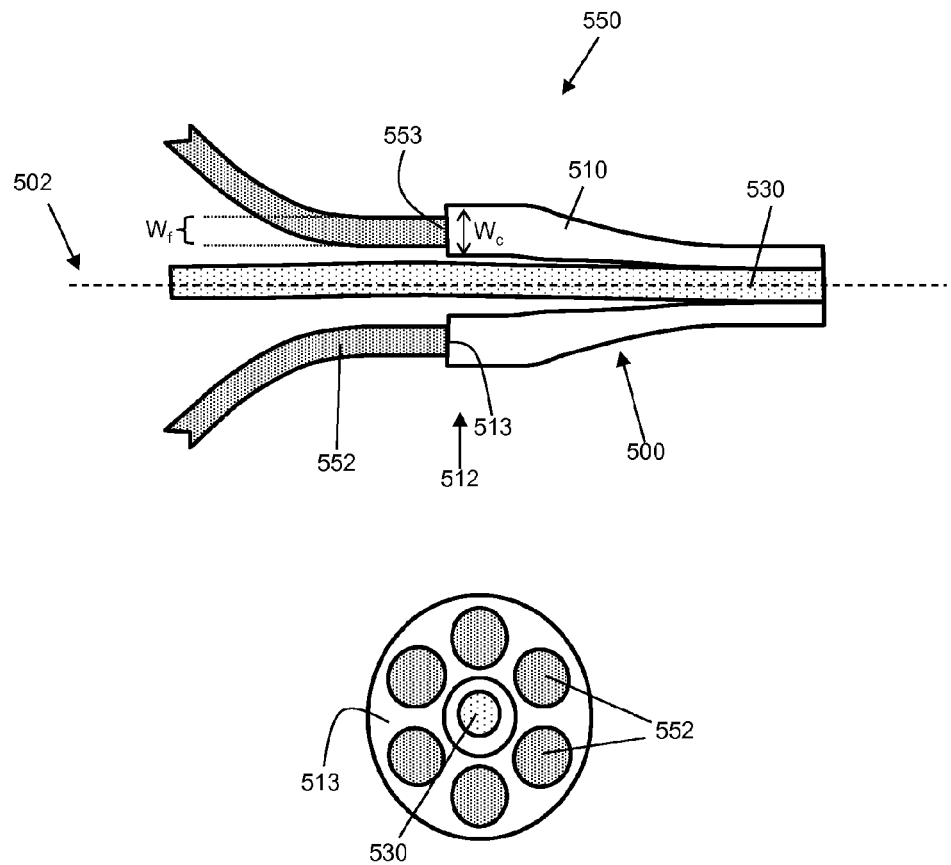
FIG. 5 is a pair of schematic cross-sectional views (along different axes) of an optical fiber device according to one embodiment of the invention.

While the cross-sectional view of FIG. 5 shows only two optical fibers 552, the person of skill in the art will recognize that the number of optical fibers coupled to the wide end of the tube can be greater (e.g., 4, or 6). For example, the rotated cross-sectional view of FIG. 5 (taken along the end face 513 of the wide end of the tube) shows six optical fibers 552 arranged in a hexagon along the end face 513.

In another embodiment, the optical fiber device further comprises a polarization-maintaining output optical fiber optically coupled to the coupler end face of the optical coupler. The polarization-maintaining optical fiber can, for example, have a birefringence that is substantially greater than the birefringence of the polarization-maintaining feed-through optical fiber. In certain embodiments, the polarization-maintaining optical fiber coupled to the coupler end face comprises a core, a cladding surrounding the core, and one or more birefringence-inducing elements disposed in the cladding, the one or more birefringence-inducing elements extending radially in the cladding to a diameter of greater than the diameter of the polarization-maintaining feed-through optical fiber at the coupler end face (for example, greater than about 200 µm, or greater than about 50% of the diameter of the polarization-maintaining input optical fiber). For example, a standard polarization-maintaining optical fiber can be used as the polarization-maintaining output optical fiber coupled to the coupler end face. The polarization-maintaining output optical fiber coupled to the coupler end face can be, for example, a double-clad fiber.

Figure 6:
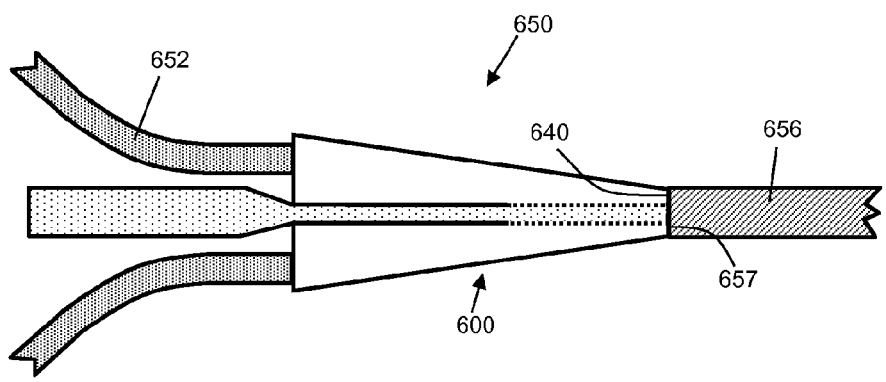
FIG. 6 is a schematic cross-sectional view of an optical fiber device according to another embodiment of the invention.

FIG. 6 is a schematic cross-sectional view of an optical fiber device according to one embodiment of the invention. Optical fiber device 650 includes optical coupler 600, for example as described above with respect to FIG. 4. Optical fibers (e.g., pump optical fibers) 652 are coupled to the optical coupler, for example, as described above with respect to FIG. 5. To the end face 640 of the coupler is optically coupled polarization-maintaining output optical fiber 656 (e.g., through its end face 657). The optical coupling can be achieved, for example, by splicing. In other embodiments, the polarization-maintaining optical fiber need not be connected directly to the end face; other methods of optical coupling can be used. In optical fiber devices having a polarization-maintaining optical fiber, light from the core of the polarization-maintaining feed-through optical fiber can be coupled to the core of the polarization-maintaining optical fiber optically coupled to the coupler end face; and light (e.g., pump radiation) from the cladding of the feed-through optical fiber and the tube can be coupled appropriately into the polarization-maintaining optical fiber optically coupled to the coupler end face (e.g., into its core; or into its first cladding if double-clad).

In certain embodiments, the outer diameter of the coupler end face is not substantially greater than the diameter of the polarization-maintaining optical fiber optically coupled thereto (i.e., in the region where it is coupled to the coupler end face). For example, as shown in FIG. 6, the diameter of optical fiber 656 at its end face 657 is about the same as the diameter of the coupler end face 640.

In certain embodiments of optical fiber devices according to the present invention, a polarization-maintaining input optical fiber is optically coupled to the second end of the polarization-maintaining feed-through optical fiber. The polarization-maintaining input optical fiber can, for example, have a birefringence that is substantially greater than the birefringence of the polarization-maintaining feed-through optical fiber. In certain embodiments, the polarization-maintaining input optical fiber optically coupled to the second end of the polarization-maintaining feed-through optical fiber comprises a core, a cladding surrounding the core, and one or more birefringence-inducing elements disposed in the cladding, the one or more birefringence-inducing elements extending radially in the cladding to a diameter of greater than the diameter of the polarization-maintaining feed-through optical fiber at the coupler end face (for example, greater than about 200 µm, or greater than about 50% of the diameter of the polarization-maintaining input optical fiber). For example, a standard polarization-maintaining optical fiber can be used as the polarization-maintaining input optical fiber. The polarization-maintaining input optical fiber optically coupled to the second end of the polarization-maintaining feed-through optical fiber can be, for example, a double-clad fiber.

Figure 7:
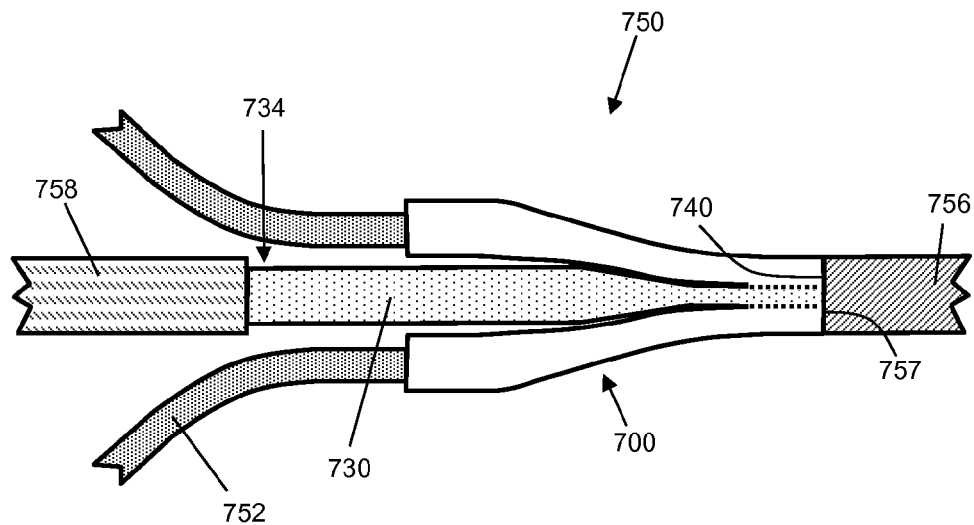
FIG. 7 is a schematic cross-sectional view of an optical fiber device according to another embodiment of the invention.

FIG. 7 is a schematic cross-sectional view of an optical fiber device according to one embodiment of the invention. Optical fiber device 750 includes optical coupler 700, for example as described above with respect to FIG. 3. Optical fibers (e.g., pump optical fibers) 752 are coupled to the optical coupler, for example, as described above with respect to FIG. 6. To the coupler end face 740 is optically coupled polarization-maintaining optical output fiber 756 (e.g., through its end face 757). To the second end 734 of the polarization-maintaining feed-through optical fiber is spliced a polarization-maintaining input optical fiber 758. In this device, an optical signal can traverse from the fiber 758 through polarization-maintaining feed-through optical fiber 730 and into fiber 756, or from the fiber 756 through polarization-maintaining feed-through optical fiber 730 and into fiber 758, while radiation from fibers 752 (e.g., pump radiation) is coupled into fiber 756.

Figure 8:
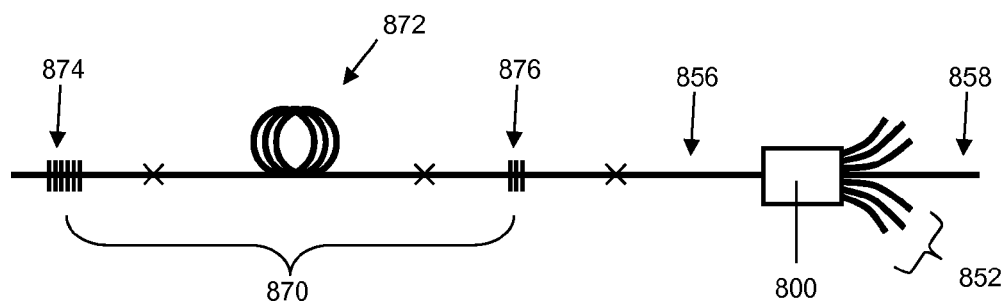
FIGS. 8-11 are schematic views of fiber lasers according to various embodiments of the invention.

Another aspect of the invention is an optical fiber laser comprising an optical coupler or optical fiber device as described above. For example, FIG. 8 is a schematic view of an example of a fiber laser according to one embodiment of the invention. The fiber laser includes a fiber laser resonator 870, which includes active fiber 872, a high-reflective fiber Bragg grating 874 and a low-reflective fiber Bragg grating 876, as is conventional in the art. The low-reflective fiber Bragg grating provides a point of extraction of laser radiation out of the resonator by having an optical reflectivity substantially smaller than 100%. For example, typical reflectivities for the high-reflective and low-reflective fiber Bragg gratings are >90% and about 10%, respectively. Of course, the person of skill in the art will recognize that alternative configurations of fiber Bragg gratings can be used. The fiber Bragg gratings are spliced to the active fiber 872 by splices (denoted as "x").

The gratings and active fibers can be formed from polarization-maintaining optical fibers.

The resonator 870 of FIG. 8 is coupled to the coupler end face of optical coupler 800 through polarization-maintaining optical fiber 856. Polarization-maintaining optical fiber 858 and pump optical fibers 852 are coupled to the optical coupler 800 as described above. The fiber laser of FIG. 8 has a so-called counter-pumped configuration, in which the pump optical radiation (i.e., from the pump optical fibers 852) and the output signal light (from the active fiber) are counter-propagating. Moreover, in the example of FIG. 8, the optical coupler 800 lies outside the resonator 870.

Figure 9:
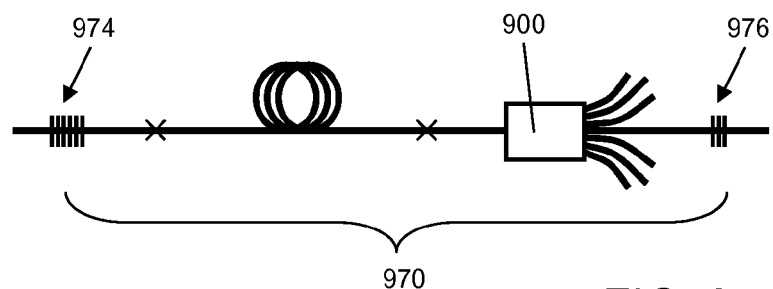

FIG. 9 is a schematic view of another example of a fiber laser. This example is similar to the fiber laser described with respect to FIG. 8, but with the optical coupler 900 disposed within laser resonator 970 (i.e., between high-reflective fiber Bragg grating 974 and low-reflective grating 976). In the configuration of FIG. 9, it is desirable for the optical coupler to have a relatively low loss for a signal fed through the polarization-maintaining signal feed-through optical fiber, as it directly contributes to the optical losses of the laser resonator.

Figure 10:
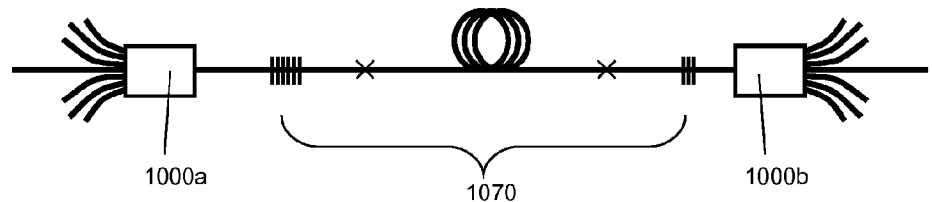

FIG. 10 is a schematic view of another example of a fiber laser. In this example, the resonator 1070 is pumped with two pump couplers 1000a and 1000b, from both ends of the resonator.

Figure 11:
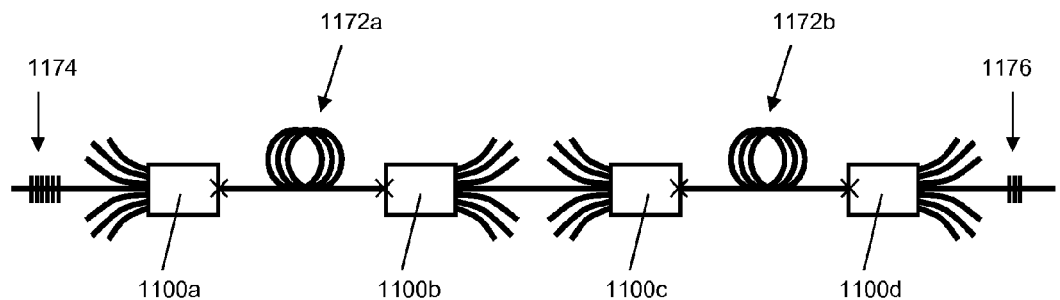

FIG. 11 is a schematic view of another example of a fiber laser. In this example, optical couplers are cascaded with multiple sections of active fiber. The fiber laser of FIG. 11 has four optical couplers (1100a, 1100b, 1100c and 1100d) connected to two active fiber sections 1172a and 1172b. Section 1172a is pumped from both ends via optical couplers 1100a and 1100b, while section 1172b is pumped from both ends via optical couplers 1100c and 1100d. The high-reflective and low-reflective fiber Bragg gratings 1174 and 1176 are coupled to the second ends of the polarization-maintaining feed-through optical fibers of optical couplers 1100a and 1100d, respectively. Of course, the person of skill in the art will recognize that a variety of other fiber laser configurations can be used with the optical couplers and optical fiber devices of the present invention. The polarization-maintaining feed-through optical fibers of the optical couplers described herein can be adapted to provide additional functionality. For example, polarization-maintaining feed-through optical fibers can be provided with Bragg gratings to provide a desired reflectivity to form one or both ends of a laser cavity.

Figure 12:
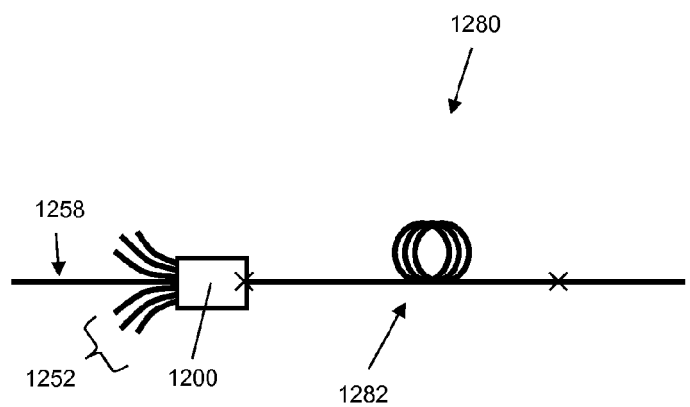
FIG. 12 is a schematic view of an optical amplifier according to one embodiment of the invention.

Another aspect of the invention is an optical fiber amplifier comprising an optical coupler or optical fiber device as described above. For example, FIG. 12 is a schematic view of an example of an optical fiber amplifier according to one embodiment of the invention. Optical fiber amplifier 1280 includes an optical coupler 1200 as described above, with an active polarization-maintaining fiber 1282 coupled to its coupler end face. Pump optical fibers 1252 and polarization-maintaining optical fiber 1258 are coupled to the optical coupler as described above. Of course, the person of skill in the art will recognize that a variety of other fiber amplifier configurations can be used with the optical couplers and optical fiber devices of the present invention. For example, the example of FIG. 12 depicts a co-pumped amplifier configuration. The person of skill in the art will recognize that counter-pumping and co-counter-pumping schemes can also be used.

Another aspect of the invention is a method for manufacturing an optical coupler as described above. The method includes providing a tube having a wide end, a narrow end having an end face, and a taper therebetween; and a polarization-maintaining feed-through optical fiber having a reduced diameter as described above (e.g., less than 75%, less than 50% or even less than 35% of the diameter of the polarization-maintaining input optical fiber, or less than about 200 µm, less than about 150 µm, or even less than about 125 µm in diameter) along at least a length thereof (e.g., as described above). The method also includes disposing the polarization-maintaining feed-through optical fiber at least partially within the tube, so that it extends from the wide section into the narrow section, and so that the length having the reduced diameter is disposed (at least partially) within the narrow section of the tube. The narrow section of the tube (at least) is then collapsed onto the polarization-maintaining feed-through optical fiber along at least part of the length having the reduced diameter, forming a fused section. It can be desirable to select the size of the polarization-maintaining feed-through optical fiber and the narrow section of the tube such that, in the region to be collapsed, the polarization-maintaining feed-through optical fiber fits relatively closely in the narrow section of the tube, in order to simplify the collapse process. The fused section is then cleaved to form a coupler end face, e.g., as described above with respect to FIG. 1.

In order to provide a device having a polarization-maintaining feed-through fiber having a varying diameter as described above, the polarization-maintaining feed-through optical fiber can be reduced in diameter (e.g., to less than 75%, less than 50% or even less than 35% of the diameter of the polarization-maintaining input optical fiber, or less than about 200 µm, less than about 150 µm, or even less than about 125 µm in diameter) along only a section thereof, while its diameter is not reduced along another section thereof. The diameter can be reduced, for example, by an etching process, for example, with hydrofluoric acid, as would be familiar to the person of skill in the art. In other embodiments, the polarization-maintaining feed-through fiber has the reduced diameter over its entire length. In certain embodiments, the optical fiber can be formed such that any birefringence-inducing elements do not extend beyond the reduced diameter so that they do not interfere with the processing, and so that they remain intact in the collapsed region in the assembled device.

The tube can be formed by a variety of methods. For example, a substantially cylindrical tubular member can be drawn (e.g., using heat and tension) to form the narrow section. Alternatively, the outer surface of a substantially cylindrical tubular member can be etched to form a taper therein, without forming a taper in the inner surface. The wide section of the tube can be cleaved and polished to form an end face for the coupling of optical fibers (e.g., pump optical fibers), as described above. Fiber splicing methods can be used to couple the optical fibers to the wide end of the tube. Optical fibers can be coupled to the wide end of the tube at any convenient point during the process, even before the polarization-maintaining feed-through optical fiber is disposed within the tube. Optical fibers can be bundled around a form, or held in a jig to position them for coupling to the wide end of the tube.

When the narrow section of the tube is collapsed onto the polarization-maintaining feed-through optical fiber, it can be desirable to refrain from collapsing the wide section of the tube thereon. Moreover, during the collapse step, and throughout the process, it can be desirable in certain embodiments to refrain from tapering the core of the polarization-maintaining feed-through optical fiber. In order to provide for efficient collapse, any gap between the narrow section of the tube and the polarization-maintaining feed-through optical fiber in the region to be collapsed is less than about 300 µm. For example, the gap can be less than about 150 µm. Some small amount of gap is desired, however, so that the polarization-maintaining optical fiber can be successfully slid into the tube in the narrow section without encountering excessive friction.

Splicing methods can be used to optically couple polarization-maintaining optical fibers to the coupler end face and/or the second end of the polarization-maintaining feed-through optical fiber.

Figure 13:
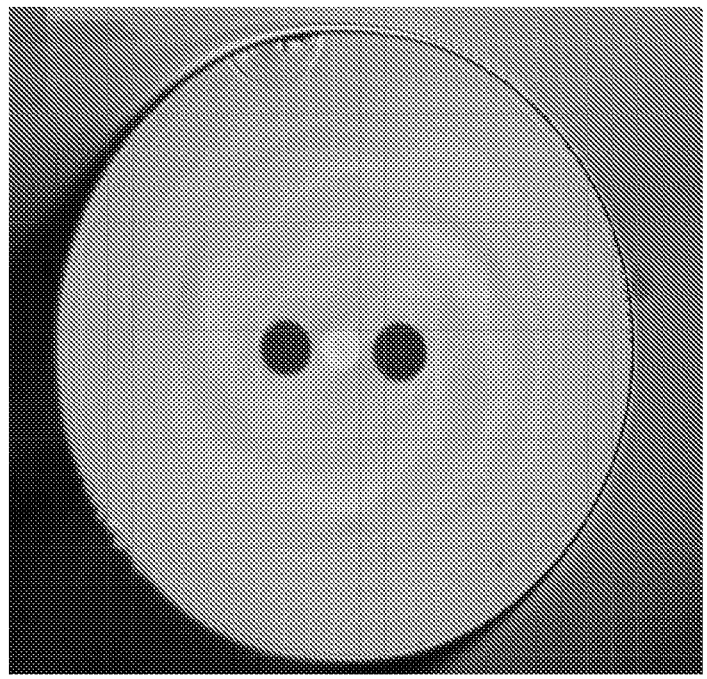
FIG. 13 is a picture of a cleaved face of a birefringent optical fiber according to one aspect of the invention, as described in Example 1.

Another aspect of the invention is a polarization-maintaining optical fiber comprising a core; a cladding surrounding the core; and one or more birefringence-inducing elements disposed in the cladding. Notably, the birefringence-inducing elements do not extend beyond a diameter of 200 μm, a diameter of 150 μm, or even a diameter of 125 μm. Such optical fibers can be advantageously used in the devices and methods described herein, as the birefringence-inducing elements would not be affected when the fiber is etched to smaller diameters. An example of such an optical fiber is shown in cross-sectional view in FIG. 13. In this embodiment, the stress rods extend to a diameter of about 115 microns.

In light of the present disclosure, the person of ordinary skill in the art can use standard optical fiber materials and processes to make the optical fibers of the present invention.

The invention is further described by the following non-limiting Examples.

Example 1

Figure 14:
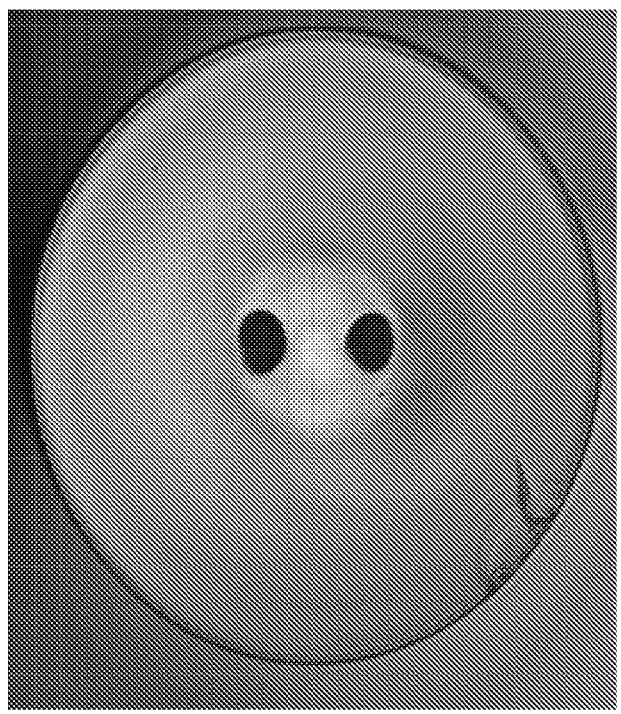
FIG. 14 is a picture of a cleaved end face of the optical fiber device described in Example 1.

A glass capillary was drawn with heat to provide a tube as described with respect to FIGS. 1 and 3. The birefringent optical fiber shown in FIG. 13 was etched with HF to just outside the birefringence-inducing elements over a section thereof about 50 mm in length, and disposed in the narrow end of the tube. The narrow end of the tube was heated to collapse around the etched fiber; and cleaved to form an end face. The cleaved end face is shown in FIG. 14.

Figure 15:
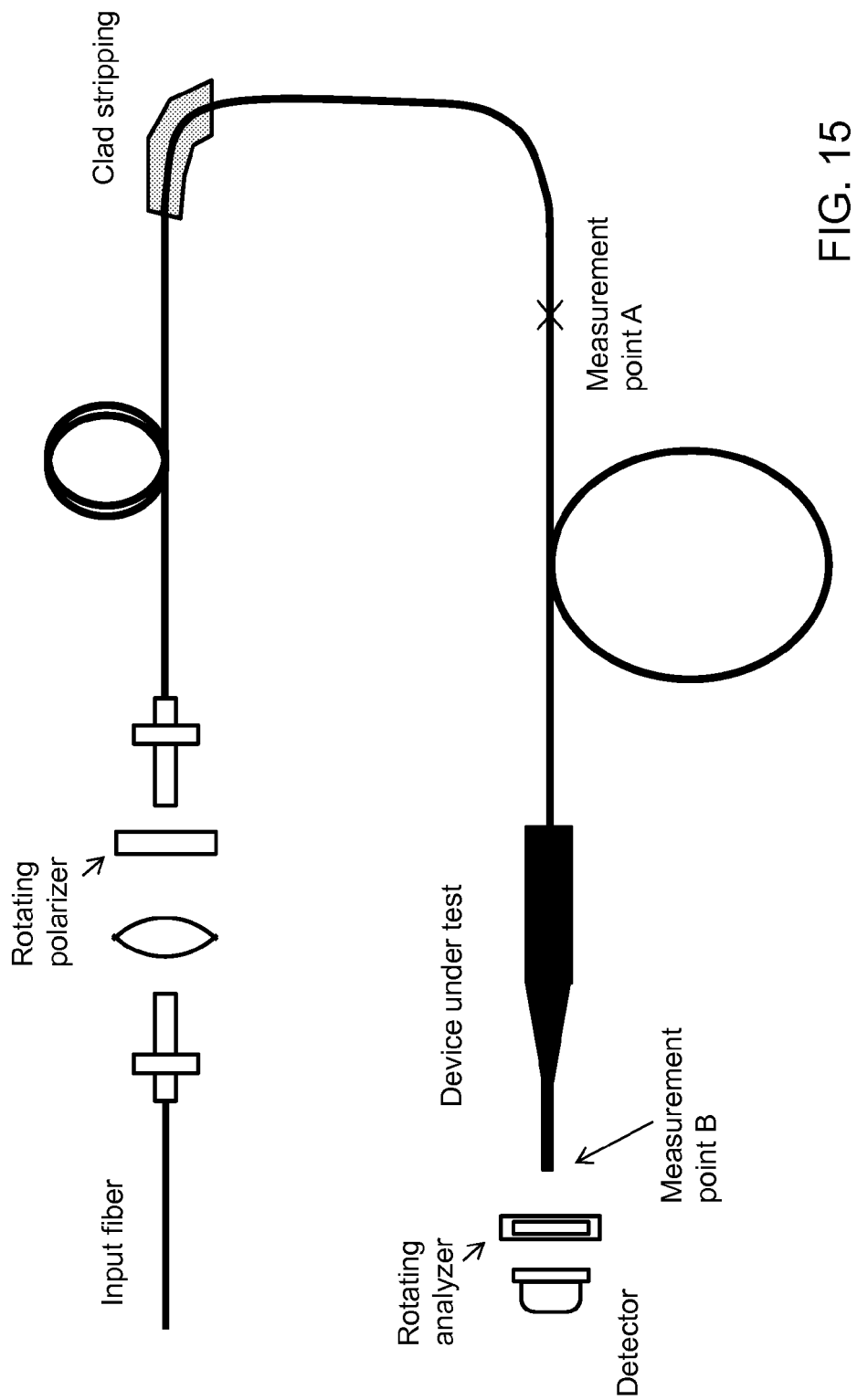
FIG. 15 is a schematic diagram of the experimental setup used in the experiments described in Example 1.
Figure 16:
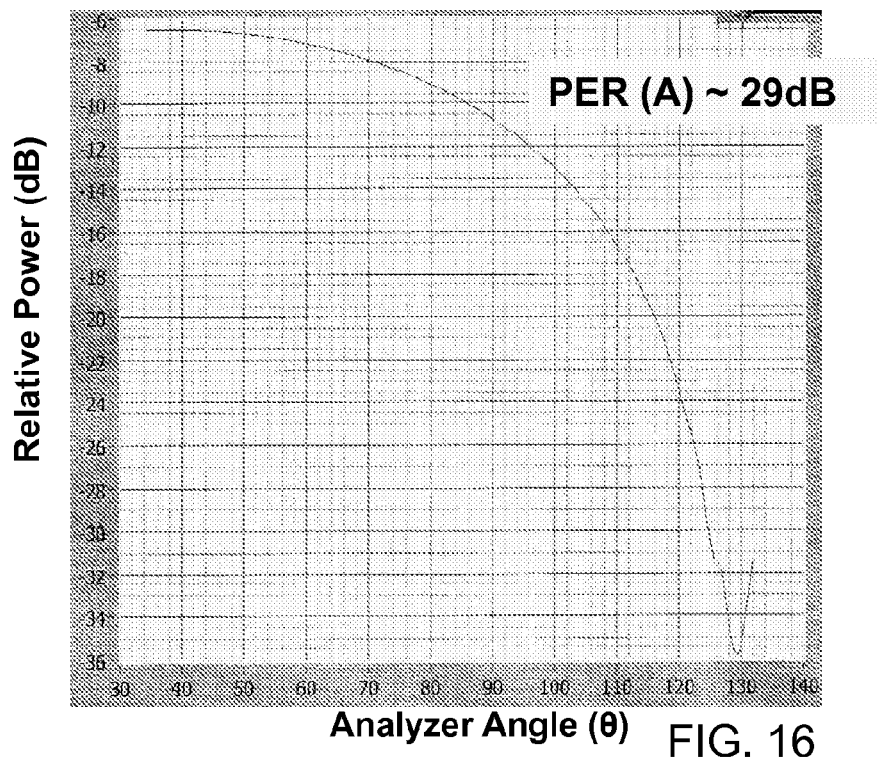
FIG. 16 is a graph of throughput power vs. analyzer angle at measurement point A, as described in Example 1.
Figure 17:
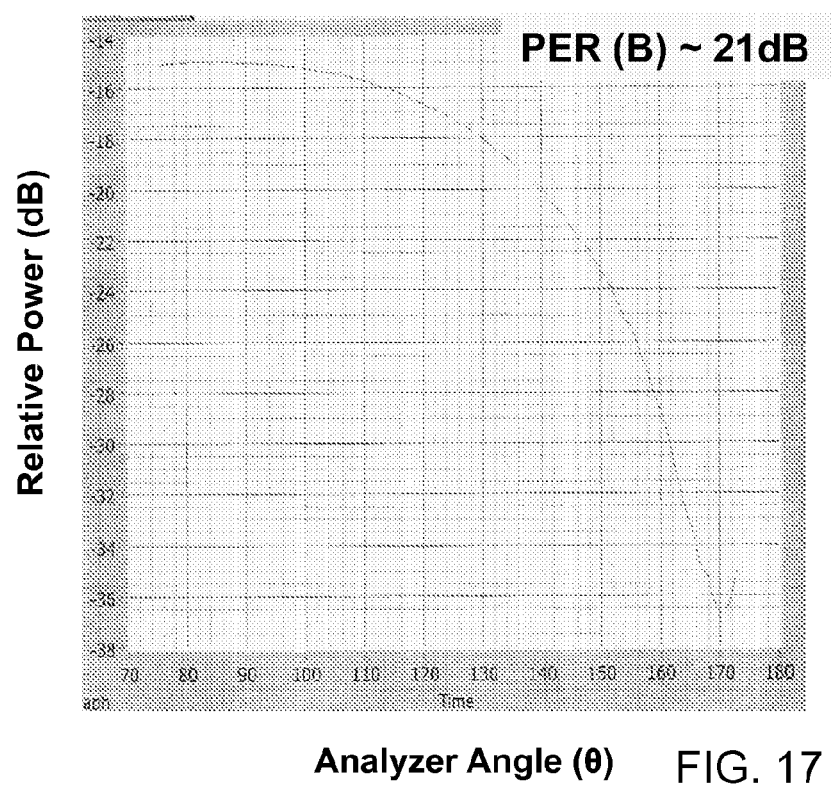
FIG. 17 is a graph of throughput power vs. analyzer angle at measurement point B, as described in the Example.

The polarization extinction ratio (PER) for the device was measured using the experimental setup shown in FIG. 15. Polarized light at a wavelength of 1 μm with a polarization extinction ratio greater than 30 dB was launched into the input of the device. The input was oriented so that the axis of polarization of the light was aligned with the major axis of the polarization-maintaining input fiber. Two orthogonal states of output light were measured. FIG. 16 provides data for Measurement Point A, before the device. FIG. 17 provides data for Measurement Point B, taken from the cleaved end of the device. Notably, the device maintained a PER of about 21 dB. The experiment was repeated using a conventional, non-polarization maintaining pump coupler, which resulted in a PER of only about 9 dB measured at the output fiber.

Example 2

Figure 18:
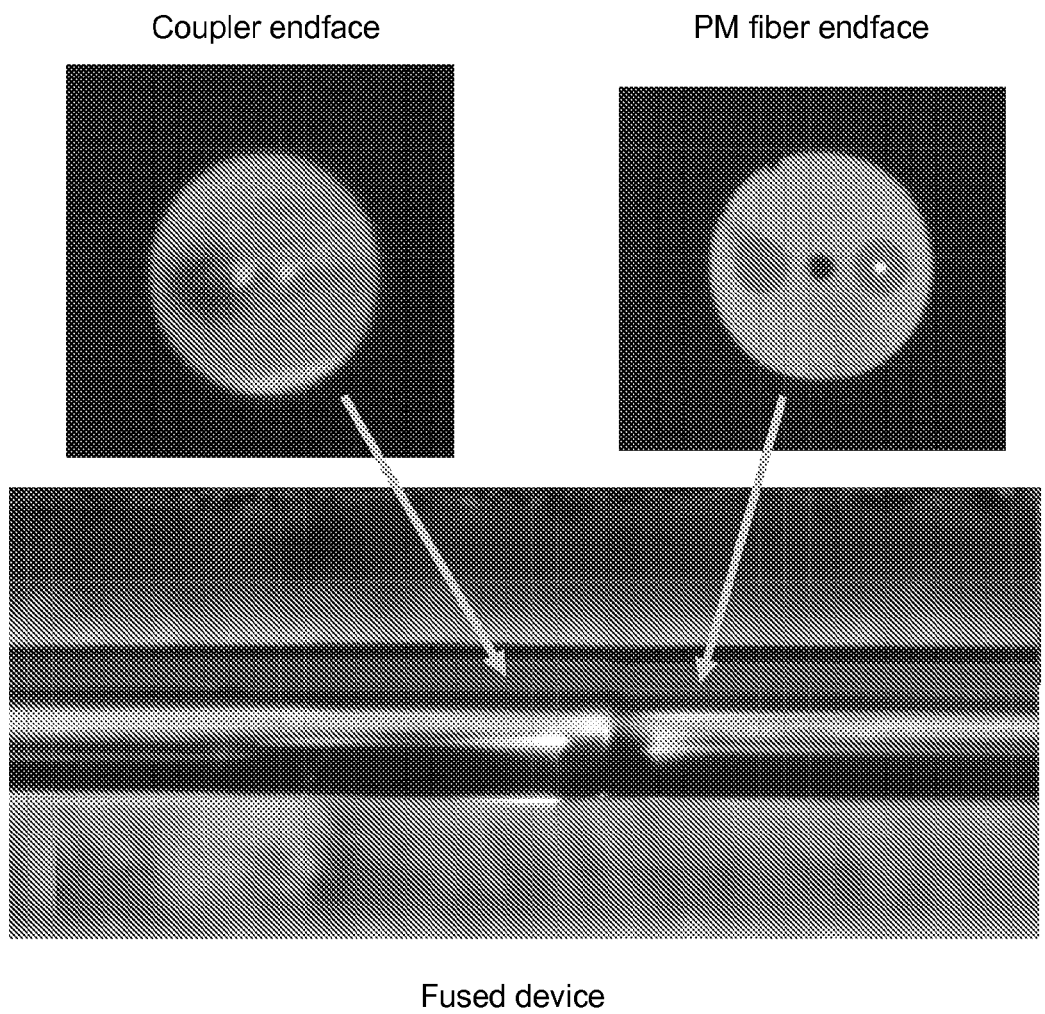
FIG. 18 is a picture of a cleaved endface of an optical fiber device, a picture of a cleaved endface of a PM fiber, and a picture of a fused device as described in Example 2.
Figure 19:
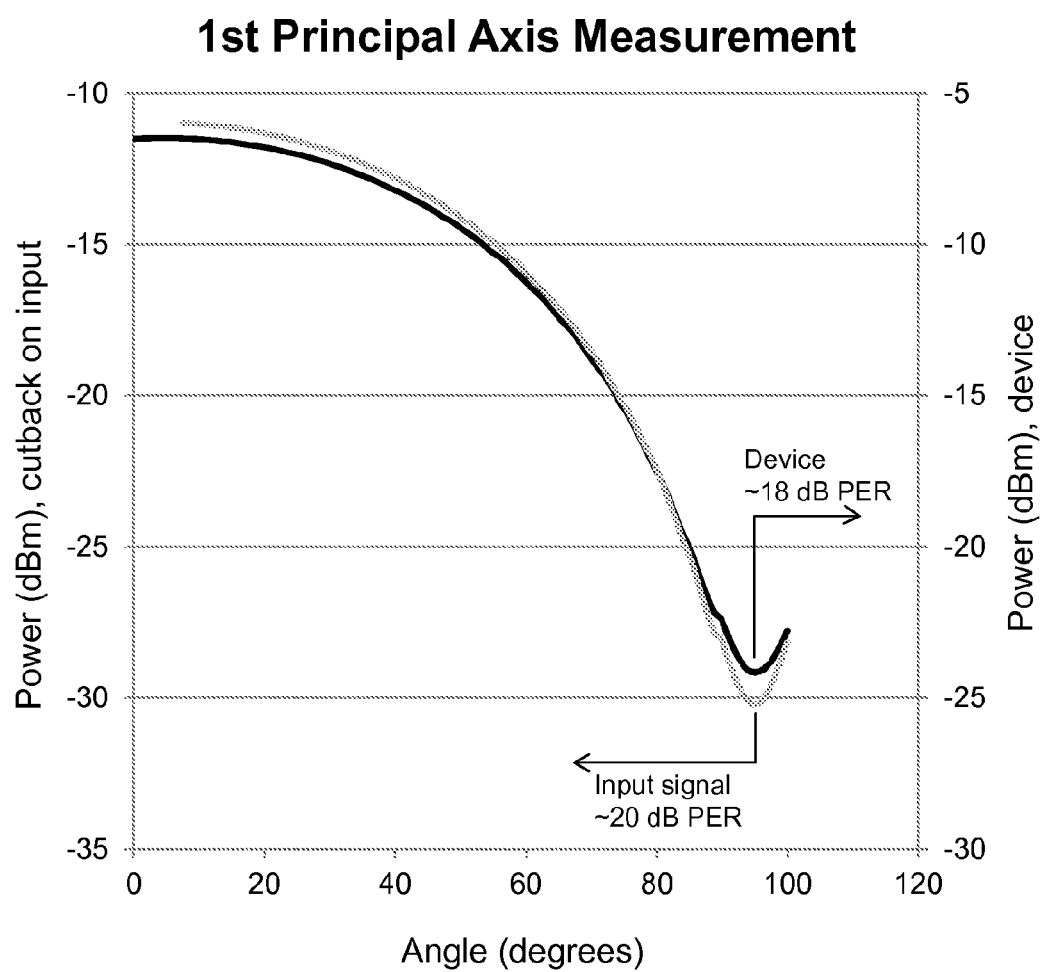
FIG. 19 is a graph of throughput power vs. analyzer angle for the device and for a cutback measurement of the input signal as described in Example 2.

A coupler was made substantially as described above in Example 1. The cleaved endface of the fiber was spliced to 25/400 polarization maintaining fiber using a $CO_2$ laser glass working station. The cleaved endface of the coupler, the cleaved endface of the PM fiber, and the fused device are shown in the pictures of FIG. 18. The PER of the overall device was measured substantially as described above with respect to FIG. 15, but measuring the output from the PM fiber. Results are shown in FIG. 19. The PER was measured to be about 18 dB The PER of the input signal was measured to be about 20 dB via a cutback method. Accordingly, the signal is transmitted through the device with very little loss of polarization integrity.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 8th Edition, 8th Revision.

It is understood that the use of the term "a", "an" or "one" herein, including in the appended claims, is open ended and means "at least one" or "one or more", unless expressly defined otherwise. The occasional use of the terms herein "at least one" or "one or more" to improve clarity and to remind of the open nature of "one" or similar terms shall not be taken to imply that the use of the terms "a", "an" or "one" alone in other instances herein is closed and hence limited to the singular. Similarly, the use of "a part of", "at least a part of" or similar phrases (e.g., "at least a portion of") shall not be taken to mean that the absence of such a phrase elsewhere is somehow limiting.

Subsequent reference to the phrase "at least one", such as in the phrase "said at least one", to specify, for example, an attribute of the limitation to which "at least one" initially referred is not to be interpreted as requiring that the specification must apply to each and every instance of the limitation, should more than one be under consideration in determining whether the claim reads on an article, composition, machine or process, unless it is specifically recited in the claim that the further specification so applies.

The use of "or", as in "A or B", shall not be read as an "exclusive or" logic relationship that excludes from its purview the combination of A and B. Rather, "or" is intended to be open, and include all permutations, including, for example A without B; B without A; and A and B together, and as any other open recitation, does not exclude other features in addition to A and B.

Any of the features described above in conjunction with any one aspect described above can be combined with a practice of the invention according to any other of the aspects described above, as is evident to one of ordinary skill who studies the disclosure herein.

Those of ordinary skill in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not expressly taught as mutually inconsistent, is included within the scope of the present invention.

What is claimed is:

1. An optical coupler for use with a polarization-maintaining input optical fiber and polarization-maintaining output optical fiber, the optical coupler comprising:
   a tube having a wide end, a narrow end having an end face, and a taper therebetween;
   a polarization-maintaining feed-through optical fiber having a first end having an end face and a second end, the polarization-maintaining feed-through optical fiber being disposed within the tube from the wide end to the narrow end, at least the narrow end of the tube being fused around a first length of the polarization-maintaining feed-through optical fiber including the first end of the polarization-maintaining feed-through optical fiber to form a coupler end face comprising the end face of the tube and the end face of the first end of the polarization-maintaining feed-through optical fiber, wherein the polarization-maintaining feed-through optical fiber has an outer diameter no greater than about 200 µm at the coupler end face and throughout the region in which the tube is fused around it, wherein the diameter of the core of the polarization-maintaining feed-through optical fiber is not substantially tapered as it traverses the tube from the wide end of the tube to the end face of the optical coupler;

wherein the polarization-maintaining feed-through optical fiber comprises a core, a cladding surrounding the core and forming the outer surface of the polarization-maintaining feed-through optical fiber, and one or more birefringence-inducing elements disposed in the cladding, wherein the one or more birefringence-inducing elements do not extend beyond a diameter of 150 µm, and do not extend to the outer surface of the cladding of the polarization-maintaining feed-through optical fiber in the region in which the tube is fused around it.

2. The optical coupler according to claim 1, wherein the wide end of the tube has an annular end face.

3. The optical coupler according to claim 1, wherein the diameter of the polarization-maintaining feed-through optical fiber does not substantially change from the wide end to the narrow end of the tube.

4. The optical coupler according to claim 1, wherein at a position along its length that is disposed within the wide end of the tube, the polarization-maintaining feed-through optical fiber has an outer diameter that is substantially larger than its outer diameter along its first length around which the tube is fused.

5. The optical coupler according to claim 1, wherein the polarization-maintaining feed-through optical fiber has a narrower diameter along its first length around which the tube is fused than it does in a region where the tube is not fused around it.

6. An optical fiber device comprising an optical coupler according to claim 1.

7. The optical fiber device according to claim 6, further comprising the polarization-maintaining output optical fiber optically coupled to the coupler end face of the optical coupler.

8. The optical fiber device according to claim 7, wherein the polarization-maintaining output optical fiber optically coupled to the coupler end face has a birefringence that is substantially greater than the birefringence of the polarization-maintaining feed-through optical fiber.

9. The optical fiber device according to claim 8, wherein the outer diameter of the coupler end face is not substantially greater than the diameter of the polarization-maintaining output optical fiber.

10. The optical fiber device according to claim 8, further comprising the polarization-maintaining input optical fiber optically coupled to the second end of the polarization-maintaining feed-through optical fiber.

11. The optical fiber device according to claim 7, wherein the polarization-maintaining input optical fiber comprises a core, a cladding surrounding the core, and one or more birefringence-inducing elements disposed in the cladding, the one or more birefringence-inducing elements extending radially in the cladding to a diameter of greater than about 200 µm.

12. An optical fiber laser or amplifier comprising the optical fiber device according to claim 6.

13. A method for manufacturing an optical coupler according to claim 1, the method comprising:
providing a tube having a wide section, a narrow section and a taper therebetween;
providing a polarization-maintaining feed-through optical fiber having a diameter of less than about 200 µm along at least a length thereof, wherein the polarization-maintaining feed-through optical fiber comprises a core, a cladding surrounding the core and forming the outer surface of the polarization-maintaining feed-through optical fiber, and one or more birefringence-inducing elements disposed in the cladding, wherein the one or more birefringence-inducing elements do not extend beyond a diameter of 150 µm, and do not extend to the outer surface of the cladding of the polarization-maintaining feed-through optical fiber along the length thereof;
disposing the polarization-maintaining feed-through optical fiber at least partially within the tube, so that it extends from the wide section into the narrow section, and so that the length having the diameter of less than about 200 µm is disposed within the narrow section of the tube;
collapsing at least the narrow section of the tube onto the polarization-maintaining feed-through optical fiber along at least part of the length having the diameter of less than about 200 µm, forming a fused section; and
cleaving the fused section to form a coupler end face comprising an end face of the tube and an end face of the polarization-maintaining feed-through optical fiber.

14. The method according to claim 13, wherein collapsing at least the narrow end of the tube onto the polarization-maintaining feed-through optical fiber includes refraining from collapsing the wide section of the tube onto the polarization-maintaining feed-through optical fiber.

15. The method according to claim 13 comprising refraining from tapering the core of the polarization-maintaining feed-through optical fiber.

16. The optical coupler according to claim 1, wherein the diameter of the polarization-maintaining feed-through fiber in its length around which the tube is collapsed is less than about 75% of its diameter at a position along its length that is disposed within the wide end of the tube.

17. The optical coupler according to claim 1, wherein the polarization-maintaining feed-through optical fiber has a length of less than about 50 cm.

18. The optical coupler according to claim 1, wherein the birefringence of the polarization-maintaining feed-through optical fiber in the region in which the tube is collapsed is less than about 50% of the birefringence of the polarization-maintaining input optical fiber.

19. The optical coupler according to claim 1, wherein the polarization-maintaining feed-through optical fiber has an outer diameter no greater than about 150 µm over a length extending at least 1 cm from the coupler end face.

20. The optical coupler according to claim 1, wherein the diameter of the polarization-maintaining feed-through fiber at its second end is greater than about 200 pm.

21. An optical coupler for use with a polarization-maintaining input optical fiber and polarization-maintaining output optical fiber, the optical coupler comprising:
a tube having a wide end, a narrow end having an end face, and a taper therebetween;
a polarization-maintaining feed-through optical fiber having a first end having an end face and a second end, the polarization-maintaining feed-through optical fiber being disposed within the tube from the wide end to the narrow end, at least the narrow end of the tube being fused around a first length of the polarization-maintaining feed-through optical fiber including the first end of the polarization-maintaining feed-through optical fiber to form a coupler end face comprising the end face of the tube and the end face of the first end of the polarization-maintaining feed-through optical fiber, wherein the polarization-maintaining feed-through optical fiber has an outer diameter at the coupler end face no greater than about 75% of the diameter of the polarization-maintaining input optical fiber, and wherein the diameter of the core of the polarization-maintaining feed-through optical fiber is not substantially tapered as it traverses the tube from the wide end of the tube to the end face of the optical coupler;

wherein the polarization-maintaining feed-through optical fiber comprises a core, a cladding surrounding the core and forming the outer surface of the polarization-maintaining feed-through optical fiber, and one or more birefringence-inducing elements disposed in the cladding, wherein the one or more birefringence-inducing elements do not extend beyond a diameter of 200 μm, and do not extend to the outer surface of the cladding of the polarization-maintaining feed-through optical fiber in the region in which the tube is fused around it.

22. The optical coupler according to claim 21, wherein the diameter of the polarization-maintaining feed-through fiber in its length around which the tube is collapsed is less than about 50% of its diameter at a position along its length that is disposed within the wide end of the tube.

23. The optical coupler according to claim 21, wherein the diameter of the polarization-maintaining feed-through fiber in its length around which the tube is collapsed is less than about 75% of its diameter at its second end.

* * * * *